(12) United States Patent
Guo et al.

(10) Patent No.: US 8,898,561 B2
(45) Date of Patent: Nov. 25, 2014

(54) METHOD AND DEVICE FOR DETERMINING A DISPLAY MODE OF ELECTRONIC DOCUMENTS

(71) Applicants: Peking University Founder Group Co., Ltd., Beijing (CN); Beijing Founder Apabi Technology Ltd., Beijing (CN)

(72) Inventors: Wei Guo, Beijing (CN); Zhan Li, Beijing (CN)

(73) Assignees: Peking University Founder Group Co., Ltd., Beijing (CN); Beijing Founder Apabi Technology Ltd., Beijing (CN)

( * ) Notice: Subject to any disclaimer, the term of this patent is extended or adjusted under 35 U.S.C. 154(b) by 0 days.

(21) Appl. No.: 14/119,175

(22) PCT Filed: Dec. 31, 2012

(86) PCT No.: PCT/CN2012/088011
§ 371 (c)(1),
(2), (4) Date: Nov. 20, 2013

(87) PCT Pub. No.: WO2013/097804
PCT Pub. Date: Jul. 4, 2013

(65) Prior Publication Data
US 2014/0157116 A1 Jun. 5, 2014

(30) Foreign Application Priority Data

Dec. 30, 2011 (CN) .......................... 2011 1 0457686

(51) Int. Cl.
*G06F 17/00* (2006.01)
*G06F 17/21* (2006.01)

(52) U.S. Cl.
CPC ............ *G06F 17/212* (2013.01); *G06F 17/217* (2013.01)
USPC ............ 715/243; 715/204; 715/252; 715/253

(58) Field of Classification Search
USPC .................. 715/243, 252, 815, 864, 204, 253
See application file for complete search history.

(56) References Cited

U.S. PATENT DOCUMENTS

| | | | |
|---|---|---|---|
| 2012/0096344 A1* | 4/2012 | Ho et al. ........................ | 715/249 |
| 2013/0007602 A1* | 1/2013 | Dougherty et al. ........... | 715/251 |
| 2013/0007603 A1* | 1/2013 | Dougherty et al. ........... | 715/251 |
| 2013/0275854 A1* | 10/2013 | Lim et al. ...................... | 715/234 |

FOREIGN PATENT DOCUMENTS

| | | |
|---|---|---|
| CN | 101840693 A | 9/2010 |
| WO | 2008030879 A2 | 3/2008 |

* cited by examiner

*Primary Examiner* — Stephen Hong
*Assistant Examiner* — Matthew Ludwig
(74) *Attorney, Agent, or Firm* — The Webb Law Firm

(57) ABSTRACT

A method and a device for determining a display mode of an electronic document on a screen are provided. The method may comprise: obtaining the size of the screen and the original layout size of the electronic document; determining, from the obtained original layout size, a document layout length in a layout direction of the original layout of the electronic document; determining, from the obtained size of the screen, a screen reading length in a reading direction of the screen; and comparing the document layout length with the screen reading length to determine whether a fixed-layout display mode or a flow display mode shall be selected to display the electronic document.

14 Claims, 1 Drawing Sheet

METHOD AND DEVICE FOR DETERMINING A DISPLAY MODE OF ELECTRONIC DOCUMENTS

CROSS REFERENCE TO RELATED APPLICATIONS

This application claims the benefit of Chinese Patent Application No. 201110457686.3, filed on Dec. 30, 2011, which is incorporated herein by reference in its entirety as part of this application.

TECHNICAL FIELD

The application relates to digital publishing technology, and in particular, to a method and a device for determining a mode for displaying electronic documents and for displaying the electronic documents.

BACKGROUND OF THE APPLICATION

Common electronic documents can be classified into fixed-layout documents and flow-layout documents based on different display modes thereof. Fixed-layout documents utilize an absolute positioning mode to record the location and the size of each primitive such that the documents are scalable as a whole in accordance with various display screen sizes using a consistent typesetting format (i.e. the layout, the font or the like are entirely consistent with those of the corresponding paper documents). Therefore, fixed-layout documents have the same display effects as the corresponding paper documents. In contrast, flow-layout documents only record the size of each primitive and the sequential relationship between the primitives, and thus various display formats are available based on different screen sizes. Hence, the line feeds between paragraphs and the word sizes are adjustable according to the width of display screens.

Fixed-layout documents can be classified into the following two kinds of documents:

1) those from which data content cannot be extracted, such as scanned documents; and
2) those from which data content can be extracted, such as PDF (Portable Document Format) documents. For this kind of documents, the data contents can be reformatted according to the storage order thereof without considering their absolute positioning.

In addition to the above fixed-layout and flow-layout documents, there is another kind of document named as fixed-flow-layout documents. Fixed-flow-layout documents record not only the absolute location and the size of each primitive but also the sequential relationship between the primitives. Therefore, fixed-flow-layout documents can be displayed using both the fixed-layout mode and the flow-layout mode.

Accordingly, fixed-flow-layout documents and fixed-layout documents from which data content can be extracted (such as PDF documents) can be displayed using the fixed-layout mode or the flow-layout mode. Nowadays, fixed-flow-layout documents are generally displayed in fixed-layout by default on large screens (such as the screen of an office computer), and in flow-layout by default on screens of mobile equipment (such as the screen of a mobile phone). However, with the development of electronic equipment, their screen sizes have become highly diversified; for example, the screens of tablet PCs have become smaller and smaller, while those of mobile phones have become wider and wider. Therefore, it may be unreliable to select display modes based on equipment types, and unable to achieve optimal display effects using conventional default display methods.

SUMMARY OF THE APPLICATION

The application provides a method and a device for determining a display mode of electronic documents to solve at least one of the issues in the art as mentioned above.

In one aspect, a method for determining a display mode of an electronic document on a screen is provided. The method may comprise:

obtaining the size of the screen and the original layout size of the electronic document;

determining, from the obtained original layout size of the electronic document, a document layout length in a layout direction of the original layout of the electronic document;

determining, from the obtained size of the screen, a screen reading length in a reading direction of the screen; and comparing the document layout length with the screen reading length to determine whether a fixed-layout display mode or a flow display mode shall be selected to display the electronic document.

In another aspect, a device for determining a display mode of an electronic document on a screen is provided. The device may comprise:

a size obtaining module configured to obtain the size of the screen and the original layout size of the electronic document;

a layout length module configured to determine, from the obtained original layout size of the electronic document, a document layout length in a layout direction of the original layout of the electronic document;

a reading length module configured to determine, from the obtained size of the screen, a screen reading length in a reading direction of the screen; and a mode determining module configured to compare the document layout length with the screen reading length to determine whether a fixed-layout display mode or a flow display mode shall be selected to display the electronic document.

DETAILED DESCRIPTION

Hereinafter, the embodiments of the methods and devices for determining display modes of electronic documents will be described in detail with reference to the detailed description as well as the drawings.

Figure 1:
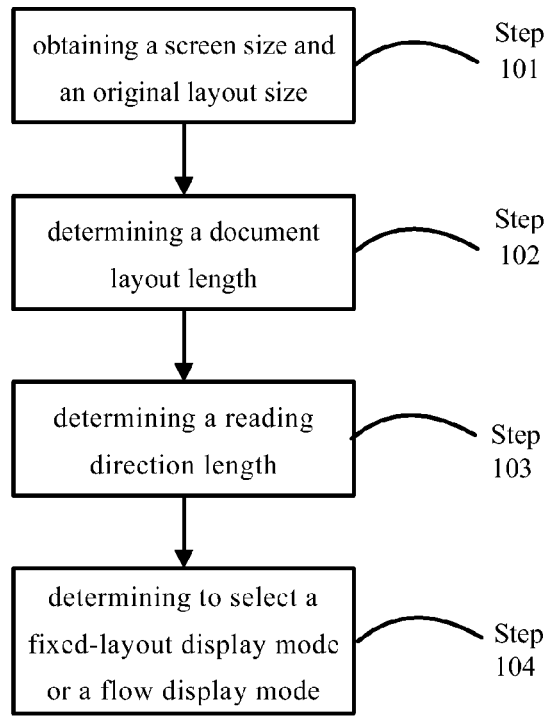
FIG. 1 schematically shows a flow chart of the method for determining display modes of electronic documents according to one embodiment of the present application.

In one embodiment as shown in FIG. 1, the method for determining a display mode of an electronic document on a screen of an equipment may comprise:

step 101: obtaining the size of the screen and the original layout size of the electronic document;

step 102: determining, from the obtained original layout size of the electronic document, a document layout length in a layout direction of the original layout of the electronic document;

step 103: determining, from the obtained size of the screen, a screen reading length in a reading direction of the screen; and step 104: comparing the document layout length with the screen reading length to determine whether a fixed-layout display mode or a flow display mode shall be selected to display the electronic document. In the fixed-layout display mode, the electronic document may be displayed according to the original layout of the electronic document. In the flow display mode, the electronic document may be displayed according to a layout obtained after the electronic document is reformatted.

The method disclosed in the present application may solve the problem in determining the optimal display mode for fixed-flow-layout documents and fixed-layout documents from which data content can be extracted based on various screen sizes.

In some embodiments, in step 101, the size of the screen may be determined by determining a ratio of a screen resolution of the equipment to an equipment resolution, wherein the screen resolution of the equipment is the number of all pixels displayed on the screen, and the equipment resolution is the number of pixels per inch displayed on the screen.

In step 101, the size of the screen may be obtained in any appropriate methods. In some embodiments, the size of the screen may be calculated by a program, obtained automatically, or inputted manually. The method for obtaining the size of the screen is not limited. In some embodiments, the screen resolution of the equipment and the equipment resolution may be obtained through the API (Application Programming Interface) of the equipment.

In some embodiments, step 104 may comprise determining whether the document layout length is smaller than the screen reading length, if yes, the fixed-layout display mode may be selected; otherwise the flow display mode may be selected.

Since the screen size may be smaller than the original layout size of the electronic document, the result of comparison between the screen size and the original layout size of the electronic document may be used to determine whether the document shall be reformatted and then displayed, i.e., to determine which display mode shall be selected, the fixed-layout display mode or the flow display mode. Nowadays, display equipment such as mobile phones, tablet PCs and the like may have two display modes: a landscape display mode and a portrait display mode. Meanwhile, electronic documents may also have two layout directions: a horizontal type and a vertical type. In some embodiments of the method disclosed in the present application, the current reading direction length of the screen (the screen reading length) may be first compared with the layout direction length of the original layout of the electronic document (the document layout length, i.e., the reading length), and then it is determined according to the comparison result whether the fixed-layout display mode or the flow display mode shall be selected.

In some embodiments, step 104 may further comprise the following steps:

determining a scale factor for the original layout size of the electronic document;

determining a scaled layout size by multiplying the document layout length by the scale factor;

determining whether the scaled layout size is smaller than the screen reading length, if yes, selecting the fixed-layout display mode and displaying the electronic document based on the scaled layout size; otherwise selecting the flow display mode to display the electronic document.

The original layout size of the electronic document may be consistent with the layout sizes used in print publication, such as A4 layout, B5 layout and the like. However, the screen size of many equipments may be smaller than the layout sizes used in print publication. In fact, the electronic document may not need to be reformatted when the screen reading length is slightly smaller than the document layout length. For example, if the screen reading length is 0.01 inch smaller than the document layout length, the electronic document may not need to be reformatted and may be displayed better through appropriately scaling the original layout size of the electronic document (within a scaling scope visible to human eyes). Therefore, in some embodiments, if the difference between the screen reading length and the document layout length is within a certain predetermined range, the electronic document may not need to be reformatted for display, but may be displayed based on the original layout of the document through slightly scaling the original layout size of the document. Thus in some embodiments, the fixed-layout display mode obtained through slightly scaling the original layout size of the document, rather than the flow layout display mode, may be selected.

In some embodiments, for determining whether the flow display mode or the fixed-layout display mode obtained through slightly scaling the original layout size of the document shall be selected, the following method may also be used:

determining a scale factor for the original layout size of the electronic document;

determining a scaled layout size by multiplying the document layout length by the scale factor; and determining whether the scaled layout size is smaller than the screen reading length, if yes, selecting the fixed-layout display mode and displaying the electronic document based on the scaled layout size; otherwise selecting the flow display mode to display the electronic document.

In some embodiments, a program may be provided to supply a data sheet comprising scale factors corresponding to the original layouts of various documents. The scale factors may be determined empirically. In some embodiments, the scale factor of an electronic document to be displayed may be determined by the program according to the original layout size of the document and the screen size of the equipment. A scaled layout size may be then obtained by multiplying the document layout length by the scale factor. For a document, it may be determined whether the scaled layout size is smaller than the screen reading length, and if yes, the fixed-layout display mode may be selected to display the electronic document based on the scaled layout size; otherwise the flow display mode may be selected to display the electronic document. The scale factor may be determined according to the original layout size of the document to provide a better human visual perception.

In some embodiments, when the flow display mode is selected, the method disclosed herein may further comprise:

step 105: calculating, according to the screen reading length and a predetermined number of words per line, a font size to be used when the document is displayed with the predetermined number of words per line along the reading direction of the screen; and step 106: determining whether the calculated font size is smaller than a predetermined font size, and if yes, selecting the predetermined font size to display, otherwise selecting the calculated font size to display.

Whatever type of equipment is used, human visual perception may be affected by the font, the font size and the number of words per line. In some embodiments, to ensure that the reader will have a better visual experience with any equipment, i.e., the reader will not feel eye irritation caused by a too small or too large font size, or by too many or too few words per line, the program disclosed herein may determine the predetermined number of words per line based on an optimal number of words per line according to a practical experience, and determine the predetermined font size based on a minimum font size which can be resolved by human eyes under normal sight distance according to a practical experience. In some embodiments, the following process may be carried out when the flow display mode is selected: 1) calculating, according to the screen reading length and a predetermined number of words per line, a font size to be used when the document is displayed with the predetermined number of words per line along the reading direction; and 2) determining whether the calculated font size is smaller than the predetermined font size, and if yes, selecting the predetermined font size to display, otherwise selecting the calculated font size to display. When using predetermined font size to display, the number of words per line may not be the same as the predetermined number of words per line. Hence, the display effect may be suitable for human eyes when the document is reformatted with the selection of the flow display mode, or when the document is displayed based on the predetermined number of words per line or the predetermined font size.

Hereinafter, the method for determining the display mode of electronic documents will be further described with reference of embodiments.

Embodiment 1

To display an A4 sized e-book on a tablet PC, the method comprised the following steps.

Step A1: the screen size of the tablet PC and the original layout size of the e-book are obtained.

Specifically, the screen resolution of the tablet PC (which is 768×1024 pixels) and the equipment resolution of the table PC (which is 132 pixels/inch) are obtained, and the ratio of the screen resolution to the equipment resolution is calculated to obtain the screen size of the tablet PC (which is 5.82×7.76 inches). Hence, when the tablet PC is used in the landscape display mode, the screen reading length (i.e. the length in the reading direction of the screen) is 5.82 inches; when the table PC is used in the vertical display mode, the screen reading length is 7.76 inches. The original layout size of the e-book is 8.27 (width)×11.69 (height) inches according to the A4 layout, wherein the document layout length (i.e. the length in the layout direction of the original layout of the e-book) is 8.27 inches.

Step A2: the document scale factor is determined as 0.7, and the scaled layout size is obtained by multiplying the document layout length by the document scale factor. For example, the document layout length is 8.27 inches, and the document scale factor is 0.7. Accordingly, the scaled layout size is 5.79 inches.

Step A3: it is determined whether the scaled layout size is less than the screen reading length, and if yes, the fixed-layout display mode will be selected; otherwise the flow display mode will be selected.

Specifically, if the tablet PC is used in the landscape display mode, the screen reading length (which is 5.82 inches) is greater than the scaled layout size (which is 5.79 inches), and thus the fixed-layout display mode is selected, i.e., the e-book is displayed with the scaled layout size of 5.79 inches according to the original layout of the e-book.

If the table PC is used in the vertical display mode, the screen reading length (which is 7.76 inches) is greater than the scaled layout size (which is 5.79 inches), and thus the fixed-layout display mode is selected again. That is, the e-book is displayed with the scaled layout size of 5.79 inches according to the original layout of the e-book.

Embodiment 2

To display an A4 sized e-book on a mobile phone, the method comprises the following steps.

Step B1: the screen size of the mobile phone and the original layout size of the e-book are obtained.

Specifically, the screen resolution of the mobile phone (which is 640×960 pixels) and the equipment resolution of the mobile phone (which is 326 pixels/inch) are obtained. The ratio of the screen resolution to the equipment resolution is calculated to obtain the screen size of the mobile phone (which is 1.96×2.94 inches). Hence, when the mobile phone is used in the landscape display mode, the screen reading length is 1.96 inches; and when the mobile phone is used with the vertical display mode, the screen reading length is 2.94 inches. The original layout size of the e-book is 8.27 (width)×11.69 (height) inches, and its document layout length is 8.27 inches.

Step B2: the document scale factor is determined as 0.7, and the scaled layout size is obtained by multiplying the document layout length by the document scale factor. Specifically, the document layout length is 8.27 inches, and the document scale factor is 0.7. Accordingly, the scaled layout size is 5.79 inches.

Step B3: it is determined whether the scaled layout size is smaller than the screen reading length, and if yes, the fixed-layout display mode will be selected; otherwise the flow display mode will be selected.

Specifically, if the mobile phone is used in the landscape display mode, the screen reading length of 1.96 inches is smaller than the scaled layout size (which is 5.79 inches), and thus the flow display mode will be selected. If the mobile phone is used in the vertical display mode, the screen reading length of 2.94 inches is smaller than the scaled layout size (which is 5.79 inches), and thus the flow display mode will be selected again.

Step B4: the font size, with which the document would be displayed based on the predetermined number of words per line along the current reading direction of the screen, is calculated according to the screen reading length and the predetermined number of words per line. And then it is determined whether the calculated font size is smaller than the predetermined font size. If yes, the document will be displayed with the predetermined font size; otherwise the document will be displayed with the predetermined number of words per line.

For example, the predetermined number of words per line may be determined as 20, and the predetermined font size may be determined as 12 points.

When the mobile phone is used in the landscape display mode, the screen reading length is 1.96 inches, and the font size would be 7 points if the number of word per line is 20. The font size of 7 points is smaller than the predetermined font size of 12 points. Therefore, the predetermined word size of 12 points will be selected to display the document.

When the mobile phone is used in the vertical display mode, the screen reading length is 2.94 inches, and the font size will be 10 points if the number of words per line is 20. The font size is smaller than the predetermined font size of 12 points. Therefore, the predetermined word size of 12 points will be selected to display the document.

Figure 2:
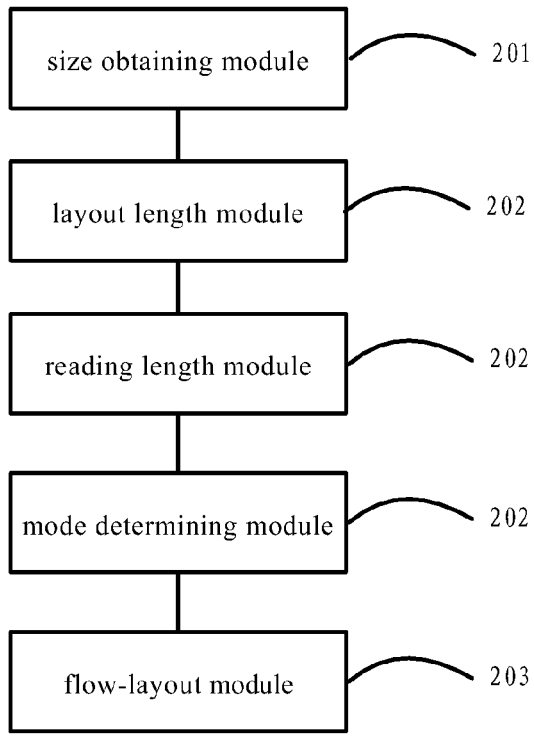
FIG. 2 schematically shows a structure of the device for determining display modes of electronic documents according to one embodiment of the present application.

In some embodiments as shown in FIG. 2, a device for determining a display mode of an electronic document on a screen of an equipment is also provided. The device may comprise:

a size obtaining module 201 configured to obtain the size of the screen and the original layout size of the electronic document;

a layout length module 202 configured to determine, from the obtained original layout size of the electronic document, a document layout length in a layout direction of the original layout of the electronic document;

a reading length module 203 configured to determine, from the obtained size of the screen, a screen reading length in a reading direction of the screen; and a mode determining module 204 configured to compare the document layout length with the screen reading length to determine whether a fixed-layout display mode or a flow display mode shall be selected to display the electronic document.

In some embodiments, the size obtaining module 201 may be configured to calculate a ratio of a screen resolution of the equipment to an equipment resolution so as to obtain the screen size, wherein the screen resolution of the equipment is the number of all pixels displayed on the screen, and the equipment resolution is the number of pixels per inch displayed on the screen.

In some embodiments, the mode determining module 204 may be configured to determine whether the document layout length is smaller than the screen reading length, and if yes, selecting the fixed-layout display mode, otherwise selecting the flow display mode.

In some embodiments, the mode determining module 204 may be configured to determine a scale factor based on the original layout size of the document, so as to calculate a scaled layout size by multiplying the document layout length by the scale factor. The mode determining module 204 may also be configured to determine whether the scaled layout size is smaller than the screen reading length, and if yes, select the fixed-layout display mode so that the document is displayed with the scaled layout size, otherwise select the flow display mode.

In some embodiments, the device for determining the display mode of the electronic document may further comprise:

a flow-layout module 205 configured to calculate, when the document is displayed based on a predetermined number of words per line along the current reading direction of the screen, a font size according to the screen reading length and the predetermined number of words per line; and to determine whether the calculated font size is smaller than the predetermined font size, and if yes, select the predetermined font size for display, otherwise select the calculated font size for display.

A person having ordinary skill in the art should appreciate that the function and operation of each module mentioned above in the device disclosed herein may be implemented by a processor of the device. The methods for determining the display mode of the electronic document described above may be implemented by a processor. The device may include a storage medium that stores the program for performing the methods. The storage medium may include one or more magnetic storage media such as hard drive disks; one or more optical storage media such as computer disks (CDs), DVDs; one or more semiconductor storage medium such as flash drives, SD cards, memory sticks; or any other suitable computer readable medium.

Embodiments and implementations of the present application have been illustrated and described, and it should be understood that various other changes may be made therein without departing form the scope of the application.

What is claimed is:

1. A computer-implemented method for determining a display mode of an electronic document on a screen of an equipment, the method comprising:

obtaining a size of the screen and an original layout size of the electronic document;

determining, from the obtained original layout size of the electronic document, a document layout length in a layout direction of the original layout of the electronic document;

determining, from the obtained size of the screen, a screen reading length in a reading direction of the screen;

comparing the document layout length with the screen reading length to determine whether a fixed-layout display mode or a flow display mode is to be selected to display the electronic document, wherein the comparing the document layout length with the screen reading length comprises:

determining a scale factor for the original layout size of the electronic document;

determining a scaled layout size by multiplying the document layout length by the scale factor; and determining whether the scaled layout size is smaller than the screen reading length, and if yes, selecting the fixed-layout display mode to display the electronic document with the scaled layout size; otherwise selecting the flow display mode to display the electronic document.

2. The method according to claim 1, wherein the step of obtaining the size of the screen further comprises:

determining a ratio of a screen resolution of the equipment to an equipment resolution, wherein the screen resolution of the equipment is the number of all pixels displayed on the screen, and the equipment resolution is the number of pixels per inch displayed on the screen.

3. The method according to claim 2, wherein the step of comparing the document layout length with the screen reading length further comprises:

determining whether the document layout length is smaller than the screen reading length, and if yes, selecting the fixed-layout display mode; otherwise selecting the flow display mode.

4. The method according to claim 2, wherein the method further comprises:

if the flow display mode is selected to display the electronic document:

calculating, according to the screen reading length and a predetermined number of words per line, a font size to be used when the document is displayed based on the predetermined number of words per line along the reading direction of the screen; and determining whether the calculated font size is smaller than a predetermined font size, and if yes, selecting the predetermined font size for display; otherwise selecting the calculated font size for display.

5. The method according to claim 2, wherein, in the fixed-layout display mode, the document is displayed according to the original layout of the document, and wherein, in the flow display mode, the document is displayed according to a layout obtained after the document is reformatted.

6. The method according to claim 1, wherein the step of comparing the document layout length with the screen reading length further comprises:

determining whether the document layout length is smaller than the screen reading length, and if yes, selecting the fixed-layout display mode; otherwise selecting the flow display mode.

7. The method according to claim 6, wherein the method further comprises:
   if the flow display mode is selected to display the electronic document:
   calculating, according to the screen reading length and a predetermined number of words per line, a font size to be used when the document is displayed based on the predetermined number of words per line along the reading direction of the screen; and
   determining whether the calculated font size is smaller than a predetermined font size, and if yes, selecting the predetermined font size for display; otherwise selecting the calculated font size for display.

8. The method according to claim 6, wherein, in the fixed-layout display mode, the document is displayed according to the original layout of the document, and
   wherein, in the flow display mode, the document is displayed according to a layout obtained after the document is reformatted.

9. The method according to claim 1, wherein the method further comprises:
   if the flow display mode is selected to display the electronic document:
   calculating, according to the screen reading length and a predetermined number of words per line, a font size to be used when the document is displayed based on the predetermined number of words per line along the reading direction of the screen; and
   determining whether the calculated font size is smaller than a predetermined font size, and if yes, selecting the predetermined font size for display; otherwise selecting the calculated font size for display.

10. The method according to claim 1, wherein, in the fixed-layout display mode, the document is displayed according to the original layout of the document, and
    wherein, in the flow display mode, the document is displayed according to a layout obtained after the document is reformatted.

11. A device for determining a display mode of an electronic document on a screen of an equipment, the device comprising a processor configured for:
    obtaining a size of the screen and an original layout size of the electronic document;
    determining, from the obtained original layout size of the electronic document, a document layout length in a layout direction of the original layout of the electronic document;
    determining, from the obtained size of the screen, a screen reading length in a reading direction of the screen; and
    comparing the document layout length with the screen reading length to determine whether a fixed-layout display mode or a flow display mode is to be selected to display the electronic document,
    wherein the comparing the document length with the screen reading length comprises:
    determining a scale factor for the original layout size of the electronic document,
    determining a scaled layout size by multiplying the document layout length by the scale factor; and
    determining whether the scaled layout size is smaller than the screen reading length, and if yes, the fixed-layout display mode is selected to display the electronic document with the scaled layout size; otherwise the flow display mode is selected to display the electronic document.

12. The device according to claim 11, wherein the size obtaining module is configured to obtain the size of the screen by determining a ratio of a screen resolution of the equipment to an equipment resolution, and
    wherein the screen resolution of the equipment is the number of all pixels displayed on the screen, and the equipment resolution is the number of pixels per inch displayed on the screen.

13. The device according to claim 12, wherein the mode determining module is configured to determine whether the document layout length is smaller than the screen reading length, and if yes, the fixed-layout display mode is be selected, otherwise the flow display mode is be selected.

14. The device according to claim 11, wherein the mode determining module is configured to determine whether the document layout length is smaller than the screen reading length, and if yes, the fixed-layout display mode is be selected, otherwise the flow display mode is be selected.

* * * * *

UNITED STATES PATENT AND TRADEMARK OFFICE
CERTIFICATE OF CORRECTION

PATENT NO.        : 8,898,561 B2
APPLICATION NO.   : 14/119175
DATED             : November 25, 2014
INVENTOR(S)       : Wei Guo et al.

Page 1 of 1

It is certified that error appears in the above-identified patent and that said Letters Patent is hereby corrected as shown below:

In the Claims

Column 10, Line 13, Claim 11, after "document" insert -- layout --

Signed and Sealed this
Thirty-first Day of March, 2015

Michelle K. Lee
*Director of the United States Patent and Trademark Office*